(12) United States Patent
Wittmaak, Jr. et al.

(10) Patent No.: US 12,234,024 B2
(45) Date of Patent: Feb. 25, 2025

(54) RAM FILTER PURGE SYSTEM

(71) Applicant: Textron Innovations Inc., Providence, RI (US)

(72) Inventors: John Robert Wittmaak, Jr., Newark, TX (US); Brennan Stults, Keller, TX (US); Keith David Weaver, North Richland Hills, TX (US); Richard Lee Thackway, Trophy Club, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/226,526

(22) Filed: Jul. 26, 2023

(65) Prior Publication Data

US 2025/0033786 A1 Jan. 30, 2025

(51) Int. Cl.
*B64D 33/02* (2006.01)
*B64D 29/00* (2006.01)

(52) U.S. Cl.
CPC .............. *B64D 33/02* (2013.01); *B64D 29/00* (2013.01); *B64D 2033/0246* (2013.01)

(58) Field of Classification Search
CPC ........... B64D 33/02; B64D 29/00; F02C 7/04; F02M 35/00
See application file for complete search history.

(56) References Cited

U.S. PATENT DOCUMENTS

| | | | |
|---|---|---|---|
| 2020/0277897 A1* | 9/2020 | O'Brien | B64C 29/0033 |
| 2020/0284192 A1* | 9/2020 | Haynes | B64C 29/0033 |
| 2021/0317783 A1* | 10/2021 | Simpson | B64D 33/02 |
| 2022/0356841 A1* | 11/2022 | Bacon | F02C 7/057 |

* cited by examiner

*Primary Examiner* — Rodney A Bonnette
(74) *Attorney, Agent, or Firm* — Bradley Arant Boult Cummings LLP (57) ABSTRACT

An aircraft nacelle includes a forward cruise inlet, a forward-cruise-inlet conduit coupled to the forward cruise inlet and operable to supply air from the forward cruise inlet to an engine housed by the aircraft nacelle, an inlet barrier filter, an inlet-barrier-filter compartment coupled to the inlet barrier filter, a plurality of gills coupled between the inlet-barrier-filter compartment and the engine and operable to be in an open state and a closed state, a filter-purge door coupled to the inlet-barrier-filter compartment and operable to be in a closed state and an open state. When the plurality of gills are in the closed state and the filter-purge door is in the open state, air from the filter-purge door flows from the inlet-barrier-filter compartment through the inlet barrier filter.

20 Claims, 8 Drawing Sheets

RAM FILTER PURGE SYSTEM

TECHNICAL FIELD

This disclosure relates in general to the field of aircraft, and more particularly, but not by way of limitation, to filter systems for engines in aircraft.

BACKGROUND

This section provides background information to facilitate a better understanding of the various aspects of the disclosure. It should be understood that the statements in this section of this document are to be read in this light, and not as admissions of prior art.

Aircraft such as helicopters and tiltrotor aircraft often use pleated filter panels to protect engines of the aircraft when the aircraft are operating in environments in which contaminants such as sand & dust can be damaging to the engines during, for example, landing and takeoff. Gas turbine engines often used in such aircraft consume a considerable amount of air; as a result, panels of filters used to protect the gas turbine engines from contaminants can become plugged quickly when the aircraft are operating in a challenging environment.

In some aircraft, if a filter becomes plugged with contaminants, a bypass door opens to allow contaminated air to bypass the filter and enter the engine; however, allowing such air to enter the engine unfiltered can cause wear on the engine and reduced engine power. For a single landing, use of a bypass door may be acceptable, but if the aircraft has to sustain operations in challenging environments or conduct multiple landings, the filter will likely need to be bypassed multiple times, which could result in increased maintenance expense and reduced engine performance.

SUMMARY

An aircraft nacelle includes a forward cruise inlet, a forward-cruise-inlet conduit coupled to the forward cruise inlet and operable to supply air from the forward cruise inlet to an engine housed by the aircraft nacelle, an inlet barrier filter, an inlet-barrier-filter compartment coupled to the inlet barrier filter, a plurality of gills coupled between the inlet-barrier-filter compartment and the engine and operable to be in an open state and a closed state, a filter-purge door coupled to the inlet-barrier-filter compartment and operable to be in a closed state and an open state. When the plurality of gills are in the closed state and the filter-purge door is in the open state, air from the filter-purge door flows from the inlet-barrier-filter compartment through the inlet barrier filter.

An aircraft nacelle includes a forward cruise inlet, a forward-cruise-inlet conduit coupled to the forward cruise inlet and operable to supply air from the forward cruise inlet to an engine housed by the aircraft nacelle, an inlet barrier filter, an inlet-barrier-filter compartment coupled to the inlet barrier filter, a plurality of gills coupled between the inlet-barrier-filter compartment and the engine and operable to be in an open state and a closed state, and an adjustable air-diversion door operable to divert air from the forward cruise inlet selectively between the forward-cruise-inlet conduit and the inlet-barrier-filter compartment.

An aircraft nacelle includes a forward cruise inlet, a forward-cruise-inlet conduit coupled to the forward cruise inlet and operable to supply air from the forward cruise inlet to an engine housed by the aircraft nacelle, an inlet barrier filter comprising a filter panel hinged at an end thereof opposite the forward cruise inlet, an inlet-barrier-filter compartment coupled to the inlet barrier filter, and a plurality of gills coupled between the inlet-barrier-filter compartment and the engine and operable to be in an open state and a closed state.

This summary is provided to introduce a selection of concepts that are further described below in the Detailed Description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 1A:
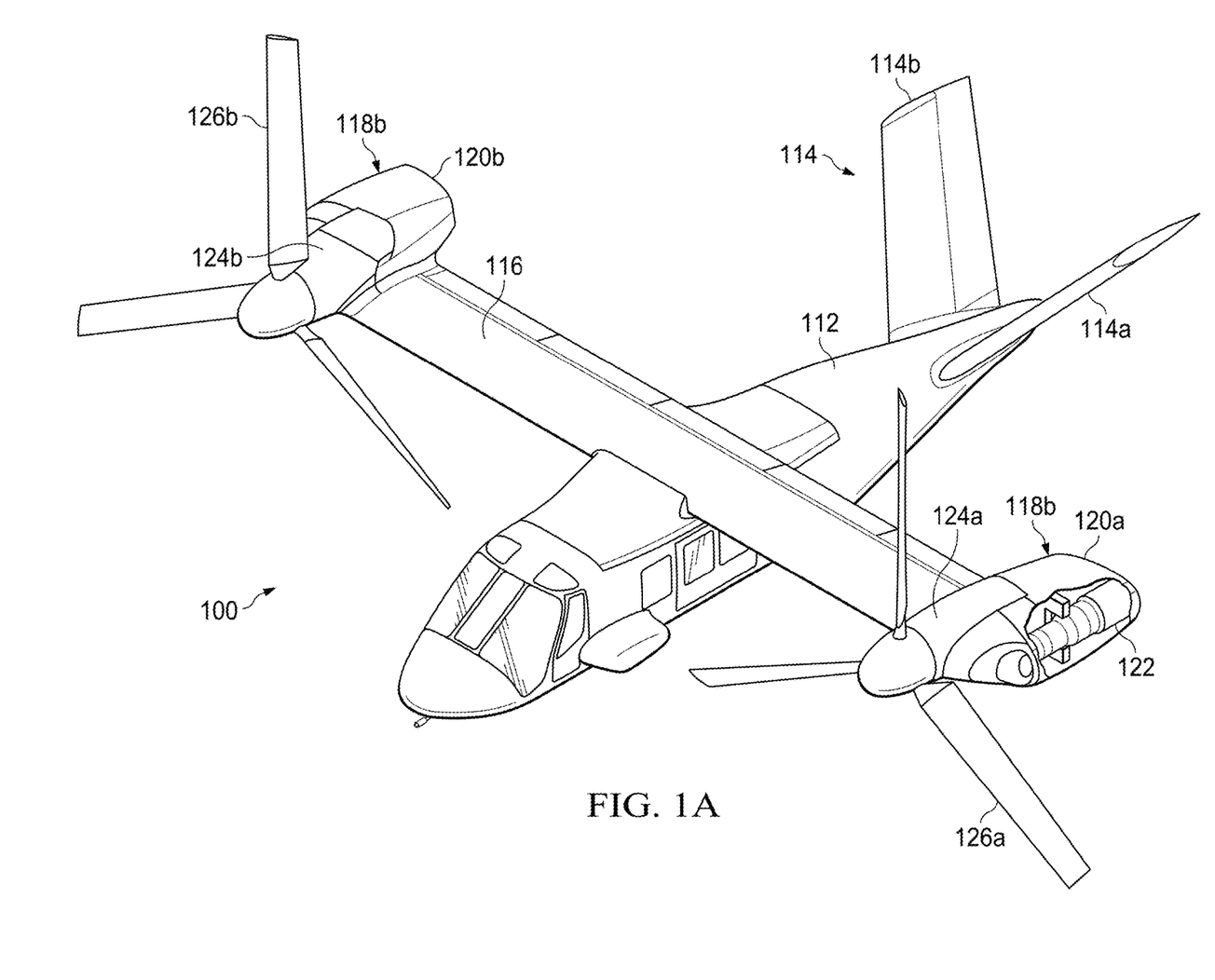
FIG. 1A is an illustration of a tiltrotor aircraft in airplane mode.
Figure 1B:
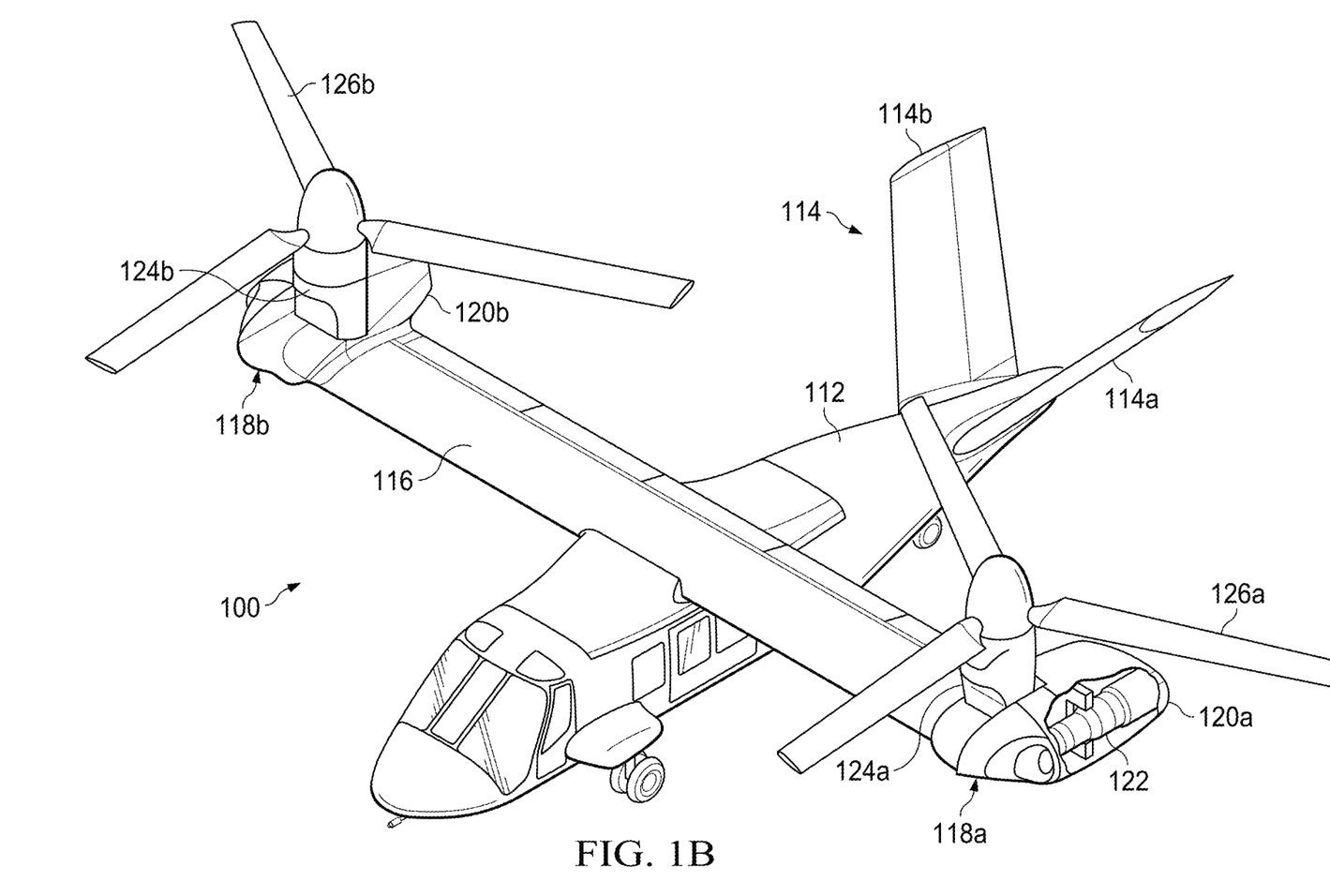
FIG. 1B is an illustration of the tiltrotor aircraft of FIG. 1 in helicopter mode.

Referring to FIGS. 1A-1B, a tiltrotor aircraft is schematically illustrated and generally designated 100. The tiltrotor aircraft 100 includes a fuselage 112 and a tail section 114 including rotatably mounted tail members 114a, 114b having control surfaces operable for horizontal and/or vertical stabilization during forward flight. A wing 116 is supported by the fuselage 112. Located at outboard ends of the wing 116 are propulsion assemblies 118a, 118b. The propulsion assembly 118a includes a fixed nacelle 120a that houses an engine 122 and a transmission. In addition, the propulsion assembly 118a includes a pylon assembly 124a that is rotatable relative to the fixed nacelle 120a between a generally horizontal orientation, as best seen in FIG. 1A, and a generally vertical orientation, as best seen in FIG. 1B. The propulsion assembly 118a also includes a proprotor assembly 126a that is rotatable relative to the pylon assembly 124a responsive to torque and rotational energy provided by a rotor hub assembly and drive system mechanically coupled to the engine 122 and the transmission. Similarly, the propulsion assembly 118b includes a fixed nacelle 120b that houses an engine and transmission, a pylon assembly 124b that is rotatable relative to the fixed nacelle 120b and a proprotor assembly 126b that is rotatable relative to the pylon assembly 124b responsive to torque and rotational energy provided via a rotor hub assembly and drive system mechanically coupled to the engine and transmission housed by the fixed nacelle 120b. As used herein, the term "coupled" may include direct or indirect coupling by any means, including moving and/or non-moving mechanical connections.

FIG. 1A illustrates the tiltrotor aircraft 100 in airplane or forward flight mode, in which the proprotor assemblies 126a, 126b are rotating in a substantially vertical plane to provide forward thrust enabling the wing 116 to provide a lifting force responsive to forward airspeed, such that the tiltrotor aircraft 100 flies much like a conventional propeller-driven aircraft. FIG. 1B illustrates the tiltrotor aircraft 100 in helicopter or vertical takeoff and landing ("VTOL") flight mode, in which the proprotor assemblies 126a, 126b are rotating in a substantially horizontal plane to provide a lifting thrust, such that the tiltrotor aircraft 100 flies much like a conventional helicopter. It should be appreciated that the tiltrotor aircraft 100 can be operated such that the proprotor assemblies 126a, 126b are selectively positioned between forward flight mode and VTOL flight mode, which can be referred to as a conversion flight mode. Even though the tiltrotor aircraft 10 has been described as having one engine in each of the fixed nacelles 120a, 120b, it should be appreciated by those having ordinary skill in the art that other engine arrangements are possible and are within the scope of the present disclosure including, for example, alternatively or additionally having an engine housed within the fuselage 112 that provides torque and rotational energy to both of the proprotor assemblies 126a, 126b.

It should be appreciated that the tiltrotor aircraft 100 is merely illustrative of a variety of aircraft that can implement the embodiments disclosed herein. Other aircraft implementations can include hybrid aircraft, tiltwing aircraft, quad tiltrotor aircraft, unmanned aircraft, gyrocopters, airplanes, jets, helicopters, and the like. As such, those of ordinary skill in the art will recognize that systems such as those set forth herein can be integrated into a variety of aircraft configurations. It should be appreciated that even though aircraft are particularly well-suited to implement embodiments of the present disclosure, non-aircraft vehicles and devices can also implement the embodiments, including, but not limited to, automobiles or land-based vehicles. Moreover, even though various features of the disclosed embodiments are described below in reference to the tiltrotor aircraft 100, principles thereof are not limited to being employed in such an aircraft.

Figure 2:
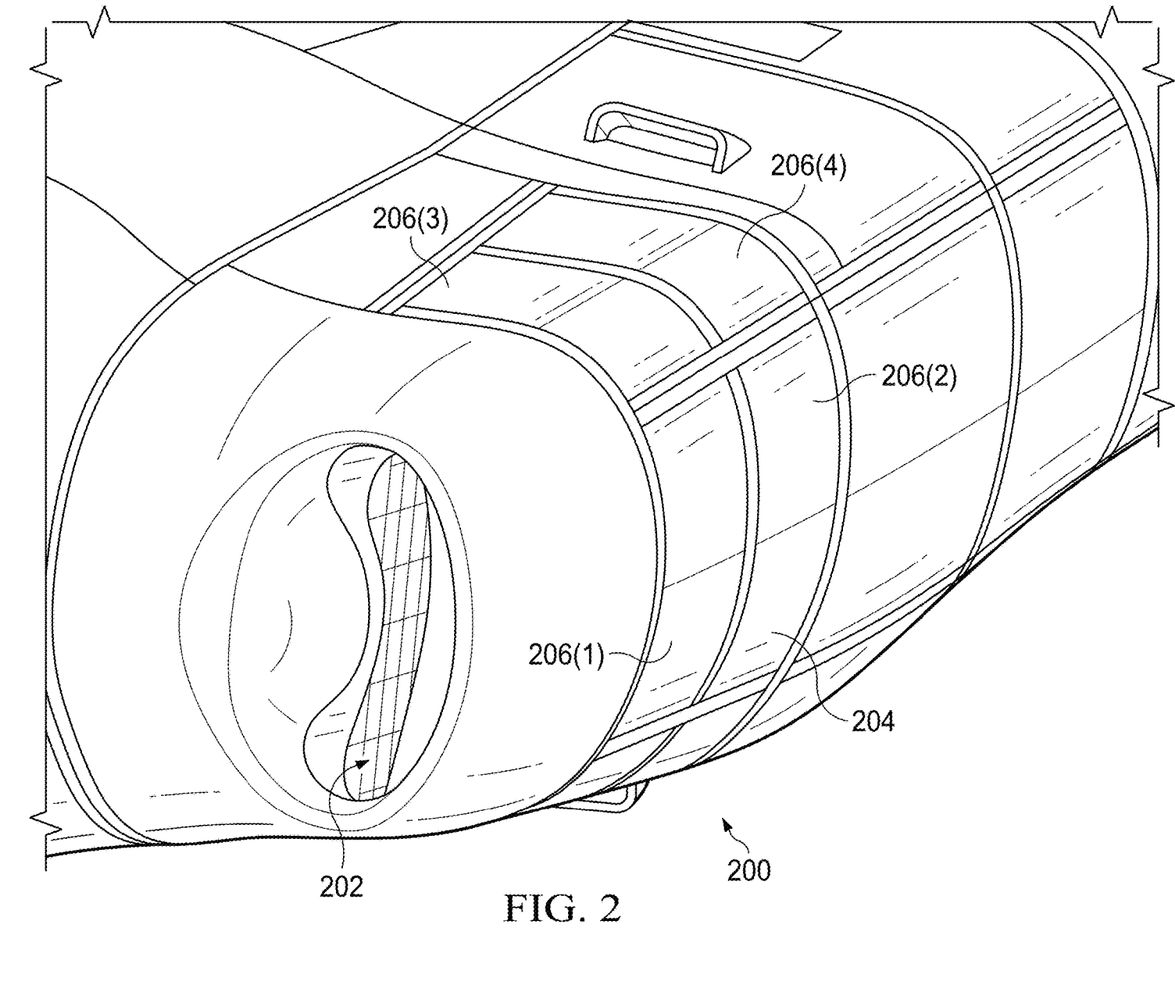
FIG. 2 is a partial perspective view of an aircraft nacelle.

FIG. 2 is a partial perspective view of an aircraft nacelle. A nacelle 200 has formed therein a forward cruise inlet 202. The nacelle 200 may be employed, for example, as the nacelle 120a. The forward cruise inlet 202 serves as an inlet for air to the engine 122 during cruise operations in which the tiltrotor aircraft 100 is operating in airplane mode, in which mode the tiltrotor aircraft 100 is not encountering dust, dirt, or other debris.

The nacelle 200 also includes an inlet barrier filter 204. The inlet barrier filter 204 provides an alternate air inlet to the engine 122, for example, when the tiltrotor aircraft 100 is in a challenging environment, such as during takeoff and landing in a dusty environment. The inlet barrier filter 204 is shown as including filter panels 206(1)-(4). Air drawn through the inlet barrier filter 204 is filtered and then passes through a plurality of gills illustrated in FIGS. 3-4 and into the engine 122. In contrast, when the forward cruise inlet 202 is utilized, air passing therethrough to the engine 122 does not pass through the plurality of gills. It is thus apparent that the inlet barrier filter 204 and the forward cruise inlet 202 are alternative paths for air to reach the engine 122.

Figure 3:
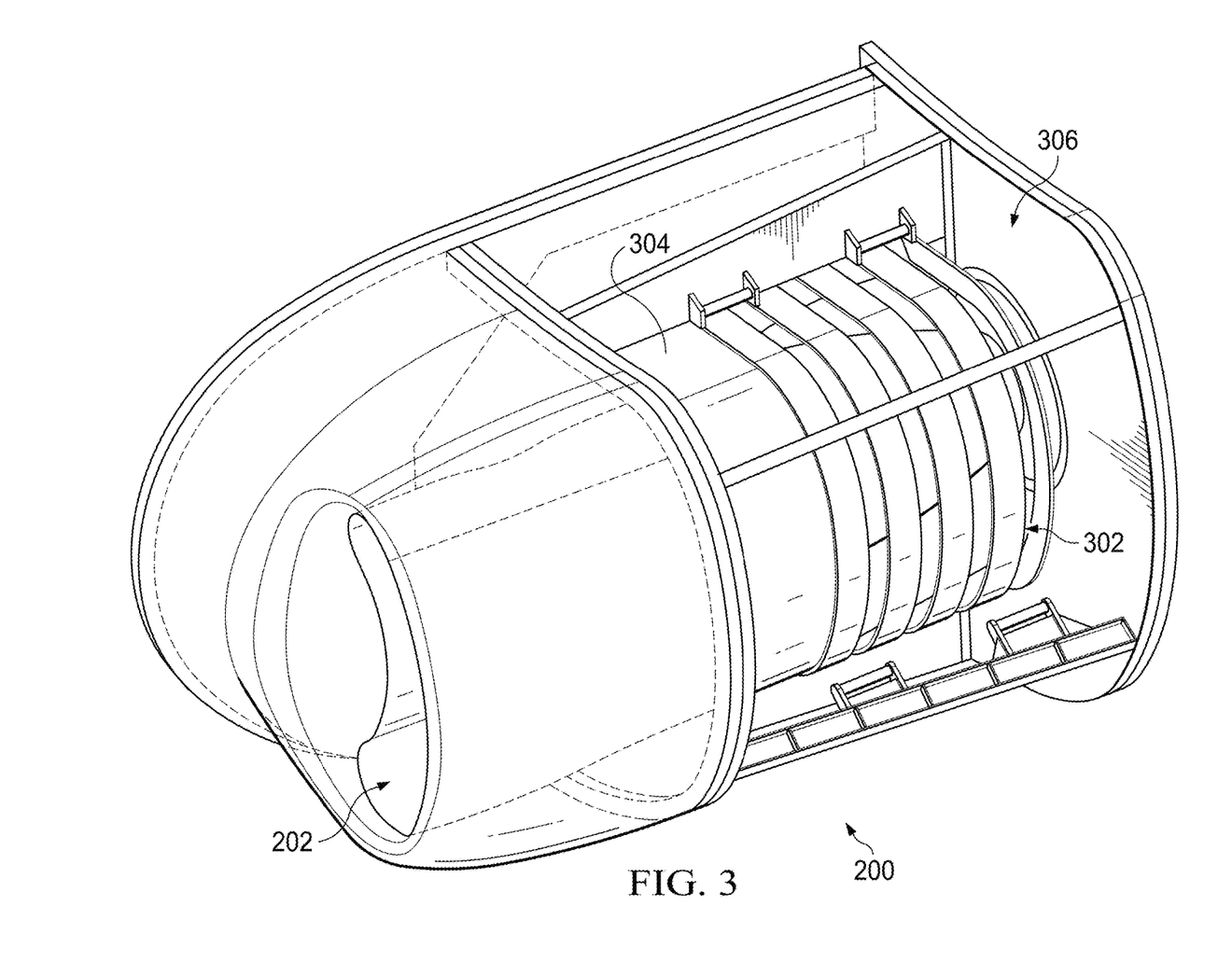
FIG. 3 is a cut-away view of the aircraft nacelle of FIG. 1 in a first operating mode.

FIG. 3 is a cut-away view of the aircraft nacelle of FIG. 1 in a first operating mode. In FIG. 3, a portion of the nacelle 200 is illustrated with the filter panels 206(1)-(4) removed. Removal of the filter panels 206(1)-(4) exposes a plurality of gills 302. Also shown is an external surface of a forward-cruise-inlet conduit 304 through which air may flow to the engine 122 from the forward cruise inlet 202. The plurality of gills 302 are shown in an open position in order to allow air to flow through the filter panels 206(1)-(4) and into an inlet-barrier-filter compartment 306. From the inlet-barrier-filter compartment 306, air flows through the plurality of gills and to the engine 122.

When the plurality of gills 302 are open as shown in FIG. 3, thereby allowing air to flow through the inlet barrier filter 204 and to the engine 122, a path for air to flow from the forward cruise inlet 202 to the engine 122 is closed. In contrast, when a path for air to flow from the forward cruise inlet 202 to the engine 122 is open, the plurality of gills 302 are closed as illustrated below in FIG. 4. Thus, as discussed above, the two paths for air to reach the engine 122 operate as alternatives to one another.

Figure 4:
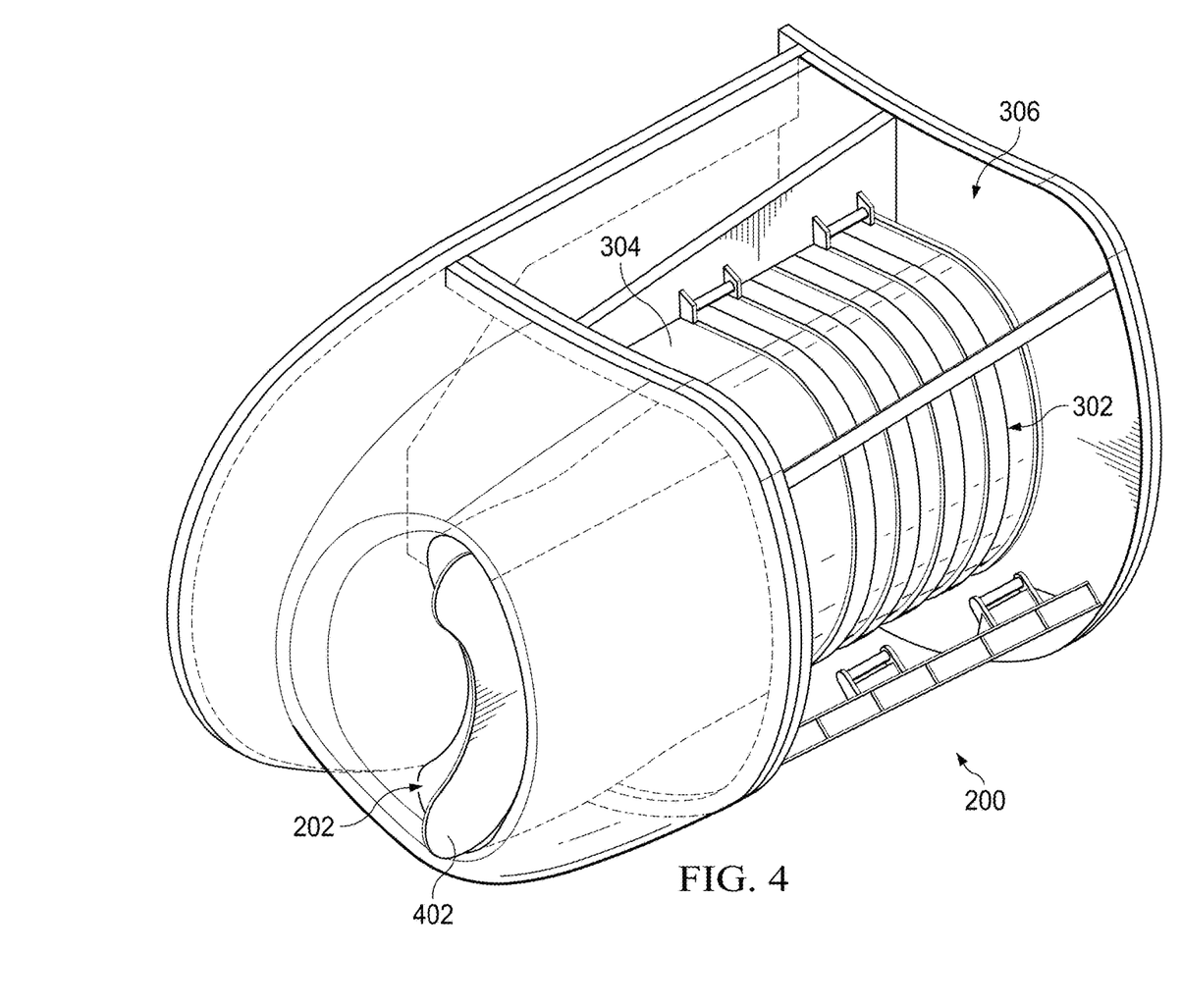
FIG. 4 is a cut-away view of the aircraft nacelle of FIG. 1 in a second operating mode.

FIG. 4 is a cut-away view of the aircraft nacelle of FIG. 1 in a second operating mode. In FIG. 4, a portion of the nacelle 200 is illustrated with the filter panels 206(1)-(4) removed. Removal of the filter panels 206(1)-(4) exposes the plurality of gills 302. Also shown is the external surface of the forward-cruise-inlet conduit 304 through which air may flow to the engine 122 from the forward cruise inlet 202. The plurality of gills 302 are shown in a closed position in order to allow air to flow through the filter panels 206(1)-(4) and into the inlet-barrier-filter compartment 306.

When the plurality of gills 302 are closed as shown in FIG. 4, thereby preventing air from flowing through the inlet barrier filter 204 and to the engine 122, a path for air to flow from the forward cruise inlet 202 to the engine 122 is open. A forward-cruise-inlet door 402 that can be opened and closed to control air flow through the forward cruise inlet 202 is shown in an open position, which position allows air to flow through the forward cruise inlet 202, through the forward-cruise-inlet conduit 304, and to the engine 122. Those having skill in the art will recognize that the air flow to the engine 122 via the forward cruise inlet 202 can be controlled at other locations and by other mechanisms along a flow path therebetween besides the forward-cruise-inlet door 402.

Figure 5:
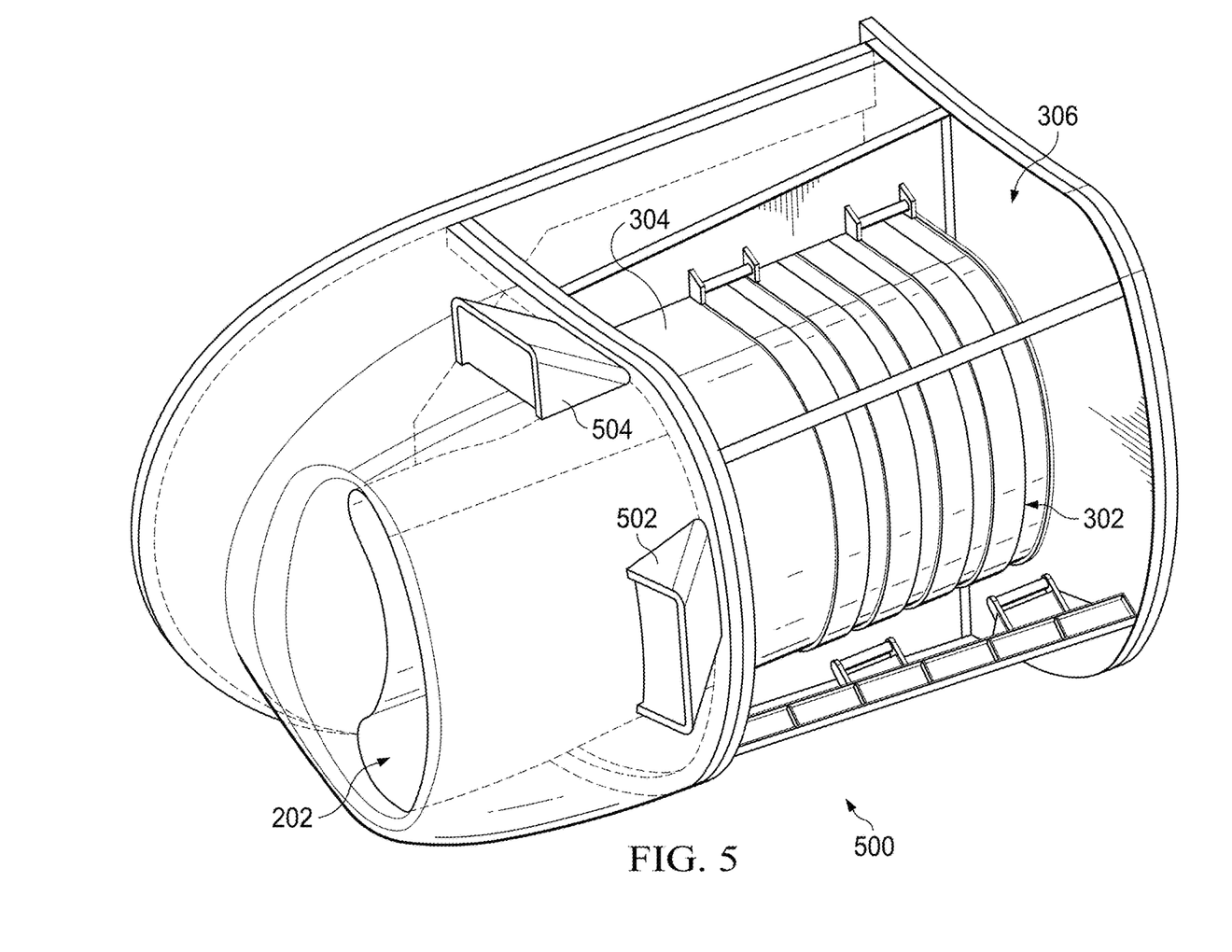
FIG. 5 is a cut-away view of an aircraft nacelle that employs a filter-purge system.

FIG. 5 is a cut-away view of an aircraft nacelle that employs a filter-purge system. FIG. 5 illustrates a nacelle 500 that includes filter-purge doors 502 and 504. The plurality of gills 302 are shown in a closed position, thereby preventing air from flowing through the inlet barrier filter 204 into the inlet-barrier-filter compartment 306. The forward cruise inlet 202 is open so as to allow air to flow via the forward-cruise-inlet conduit 304 to the engine 122.

If, during operation of the tiltrotor aircraft 100 in a challenging environment, the inlet barrier filter 204 becomes completely or partially clogged with dirt, dust, or other debris, the filter-purge doors 502, 504 may be opened in order to reverse air flow through the inlet barrier filter 204 in order to purge the debris from the inlet barrier filter 204. When, for example, the aircraft is in airplane mode, ram air flows into the forward cruise inlet 202. When the filter-purge doors 502, 504 are opened, ram air similarly flows into the inlet-barrier-filter compartment 306. In such a circumstance, because the plurality of gills 302 are closed, ram air that flows into the filter-purge doors 502, 504 flows into the inlet-barrier-filter compartment 306 and outward from the inlet-barrier-filter compartment 306 through the inlet barrier filter 204. As such, the reverse flow of air, for example, through the filter panels 206(1)-(4) of the inlet barrier filter 204 serves to dislodge debris from the inlet barrier filter 204.

Although the filter-purge doors 502, 504 are illustrated in being two in number, a single filter-purge door or more than two filter-purge doors may be employed as required by design considerations. In a typical embodiment, the filter-purge doors 502, 504 are arranged so as to be flush with an external surface of the nacelle 500 when not engaged so as to purge the inlet barrier filter 204 and to pop up when engaged so as to purge the inlet barrier filter 204.

Figure 6A:
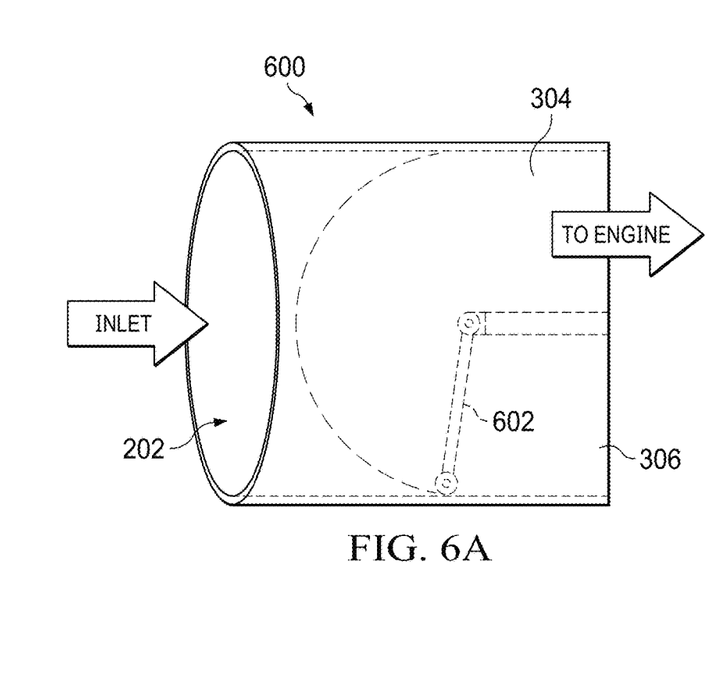
FIGS. 6A-B illustrate an aircraft nacelle that employs a filter-purge system.
Figure 6B:
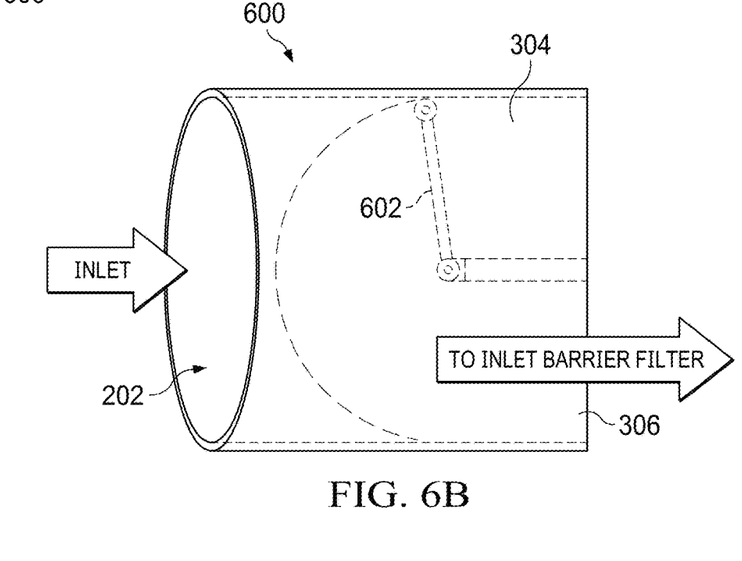

FIGS. 6A-B illustrate an aircraft nacelle that employs a filter-purge system. FIGS. 6A and 6B each illustrate a nacelle 600 that includes the forward cruise inlet 202. In contrast to the nacelle 500, the nacelle 600 utilizes the forward cruise inlet 202 to feed both the engine 122 and to provide reverse air flow through the inlet barrier filter 204 in order to perform a filter-purge operation.

FIG. 6A illustrates the nacelle 600 in cruise operation in which a selectively adjustable air-diversion door 602 in a first state in which all ram air entering the forward cruise inlet 202 enters the engine 122 and no ram air entering the forward cruise inlet 202 enters the inlet-barrier-filter compartment 306. FIG. 6B illustrates the nacelle 600 in cruise operation in which the selectively adjustable air-diversion door 602 is in a second state in which no ram air entering the forward cruise inlet 202 enters the engine 122 and all ram air entering the forward cruise inlet 202 enters the inlet-barrier-filter compartment 306 and exits the inlet barrier filter 204 so as to purge debris from the inlet barrier filter 204.

In FIG. 6B, in the state of the adjustable air-diversion door 602 shown, the plurality of gills 302 must be opened to a sufficient degree in order to allow ram air to reach the engine 122. If it is not desired to partially open the plurality of gills 302 during a filter-purge operation in order to feed air to the engine 122, the adjustable air-diversion door 602 could be positioned in an intermediate position between the positions shown between those shown in FIG. 6A and FIG. 6B such that sufficient air flows to the engine 122 and, at the same time, sufficient air flows to dislodge debris from the inlet barrier filter 204.

Figure 7:
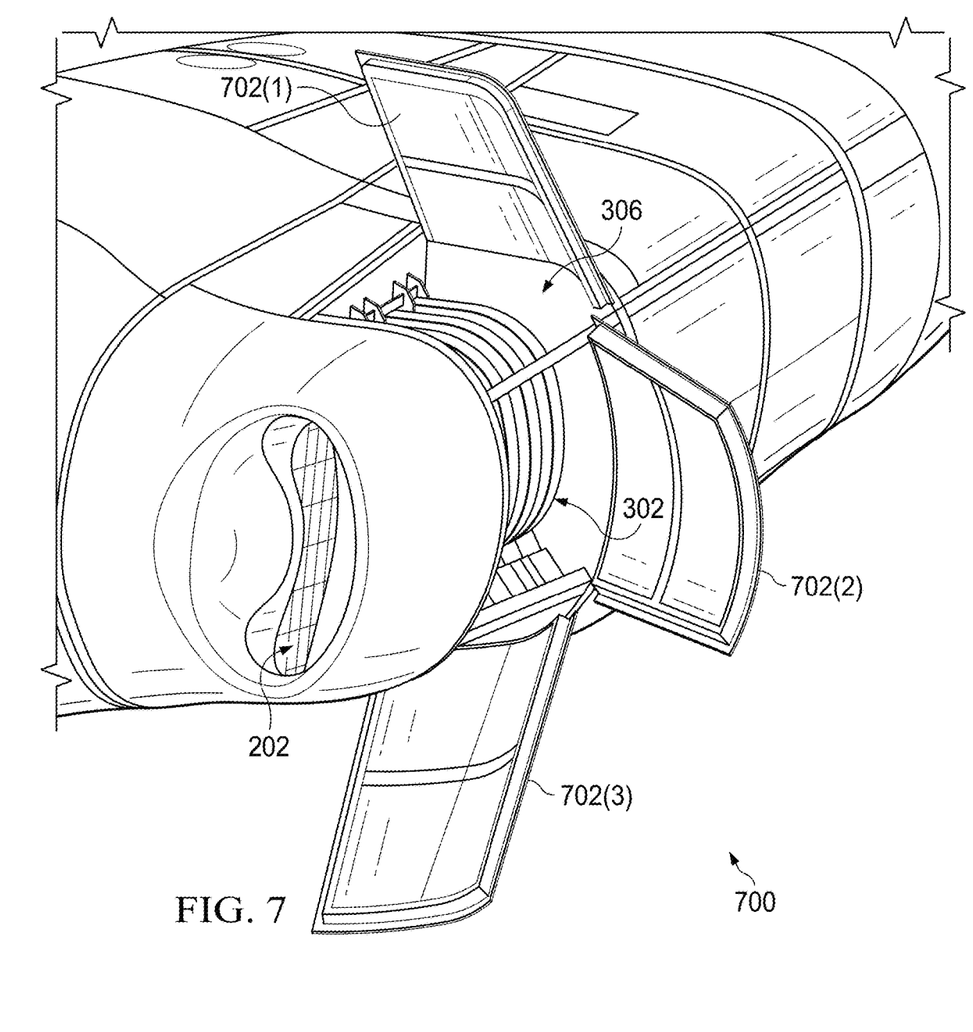
FIG. 7 is a partial perspective view of an aircraft nacelle that employs a filter-purge system.

FIG. 7 is a partial perspective view of an aircraft nacelle that employs a filter purge system. FIG. 7 shows a nacelle 700 that employs hinged filter panels 702(1)-(3). The hinged filter panels 702(1)-(3) open at an end opposite the forward cruise inlet 202 and are operable to open when the tiltrotor aircraft 100 is in cruise operation in order to force ram air through the filter panels in order to dislodge debris therefrom. The plurality of gills 302 are shown in a closed position and ram air is fed to the engine 122 via the forward cruise inlet 202 and the forward-cruise-inlet conduit 304. Although an angle of opening of the hinged filter panels 702(1)-(3) is shown to be on the order of 30-45° to illustrate the effective principle of operation, in a typical embodiment, the angle of opening would be substantially less than what is shown.

In a typical embodiment, the hammer effect, in which pressure is turned from an on position to an off position abruptly, may be utilized to further enhance the ability of solutions disclosed herein to dislodge debris from the inlet barrier filter 204. Pilot-actuation or flight-control-computer actuation, or a combination of the two, may be employed to achieve inlet-barrier-filter purge operations. In a typical embodiment, a determination that the inlet barrier filter has become clogged may be determined by detection of a pressure differential between the inlet-barrier-filter compartment and the ambient environment near the nacelle. Those having skill in the art will appreciate that features disclosed above relative to FIGS. 5-7 can be combined with one another in various combinations without departing from the principles set forth herein.

As used herein, the terms connect, connection, connected, in connection with, and connecting may be used to mean in direct connection with. Similarly, the terms couple, coupling, and coupled may be used to mean coupled directly or via one or more elements. Conditional language used herein, such as, among others, can, might, may, e.g., and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The terms substantially, approximately, and about are each defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as substantially, approximately, and about may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an and other singular terms are intended to include the plural forms thereof unless specifically excluded.

What is claimed is:

1. An aircraft nacelle comprising:
a forward cruise inlet;
a forward-cruise-inlet conduit coupled to the forward cruise inlet and operable to supply air from the forward cruise inlet to an engine housed by the aircraft nacelle;
an inlet barrier filter;
an inlet-barrier-filter compartment coupled to the inlet barrier filter;
a plurality of gills coupled between the inlet-barrier-filter compartment and the engine and operable to be in an open state and a closed state;
a filter-purge door coupled to the inlet-barrier-filter compartment and operable to be in a closed state and an open state; and
wherein, when the plurality of gills are in the closed state and the filter-purge door is in the open state, air from the filter-purge door flows from the inlet-barrier-filter compartment through the inlet barrier filter.

2. The aircraft nacelle of claim 1, comprising an adjustable air-diversion door operable to divert air from the forward cruise inlet selectively between the forward-cruise-inlet conduit and the inlet-barrier-filter compartment.

3. The aircraft nacelle of claim 1, comprising a forward-cruise-inlet door that is selectively operable to place the forward cruise inlet in the open state or the closed state.

4. The aircraft nacelle of claim 1, wherein the plurality of gills, when in the open state, supply air from the inlet-barrier-filter compartment to the engine.

5. The aircraft nacelle of claim 1, wherein the filter-purge door is flush with an external surface of the aircraft nacelle when the filter-purge door is in the closed state.

6. The aircraft nacelle of claim 5, wherein the filter-purge door is popes up and is not flush with an external surface of the aircraft nacelle when the filter-purge door is in the open state.

7. The aircraft nacelle of claim 1, wherein:
the forward cruise inlet is operable to be in an open state and a closed state; and
the forward cruise inlet is in the open state when the plurality of gills are in the closed state and the filter-purge door is in the open state.

8. An aircraft nacelle comprising:
a forward cruise inlet;
a forward-cruise-inlet conduit coupled to the forward cruise inlet and operable to supply air from the forward cruise inlet to an engine housed by the aircraft nacelle;
an inlet barrier filter;
an inlet-barrier-filter compartment coupled to the inlet barrier filter;
a plurality of gills coupled between the inlet-barrier-filter compartment and the engine and operable to be in an open state and a closed state; and
an adjustable air-diversion door operable to divert air from the forward cruise inlet selectively between the forward-cruise-inlet conduit and the inlet-barrier-filter compartment.

9. The aircraft nacelle of claim 8, comprising a plurality of gills coupled between the inlet-barrier-filter compartment and the engine and operable to be in a plurality of states bounded by an open state and a closed state.

10. The aircraft nacelle of claim 9, wherein, responsive to the adjustable air-diversion door being in a state in which the adjustable air-diversion door diverts all air from the forward cruise inlet to the inlet-barrier-filter compartment, the plurality of gills are at least partially open.

11. The aircraft nacelle of claim 8, wherein:
the adjustable air-diversion door diverts a first portion of air from the forward cruise inlet to the forward-cruise-inlet conduit and a second portion to the inlet-barrier-filter compartment; and
the plurality of gills are in the closed state.

12. The aircraft nacelle of claim 8, comprising a filter-purge door coupled to the inlet-barrier-filter compartment and operable to be in a closed state and an open state.

13. The aircraft nacelle of claim 12, wherein, responsive to the plurality of gills being in the closed state and the filter-purge door being in the open state, air from the filter-purge door flows from the inlet-barrier-filter compartment through the inlet barrier filter.

14. An aircraft nacelle comprising:
a forward cruise inlet;
a forward-cruise-inlet conduit coupled to the forward cruise inlet and operable to supply air from the forward cruise inlet to an engine housed by the aircraft nacelle;
an inlet barrier filter comprising a filter panel hinged at an end thereof opposite the forward cruise inlet;
an inlet-barrier-filter compartment coupled to the inlet barrier filter; and
a plurality of gills coupled between the inlet-barrier-filter compartment and the engine and operable to be in an open state and a closed state.

15. The aircraft nacelle of claim 14, wherein, if the inlet barrier filter becomes clogged, the filter panel opens to expose an interior surface of the filter panel to ram air.

16. The aircraft nacelle of claim 15, wherein the ram air penetrates the filter panel and dislodges debris from an external surface the filter panel.

17. The aircraft nacelle of claim 14, comprising an adjustable air-diversion door operable to divert air from the forward cruise inlet selectively between the forward-cruise-inlet conduit and the inlet-barrier-filter compartment.

18. The aircraft nacelle of claim 17, wherein:
the adjustable air-diversion door diverts a first portion of air from the forward cruise inlet to the forward-cruise-inlet conduit and a second portion to the inlet-barrier-filter compartment; and
the plurality of gills are in the closed state.

19. The aircraft nacelle of claim 14, comprising a filter-purge door coupled to the inlet-barrier-filter compartment and operable to be in a closed state and an open state.

20. The aircraft nacelle of claim 19, wherein, when the plurality of gills are in the closed state and the filter-purge door is in the open state, air from the filter-purge door flows into the inlet-barrier-filter compartment.

* * * * *